US006957666B2

(12) United States Patent
Phillips

(10) Patent No.: US 6,957,666 B2
(45) Date of Patent: Oct. 25, 2005

(54) SPRING VALVE IMPLEMENTED FLOW CONTROL VALVES

(75) Inventor: Edward H. Phillips, Troy, MI (US)

(73) Assignee: Cafe Engineering, Southfield, MI (US)

( * ) Notice: Subject to any disclaimer, the term of this patent is extended or adjusted under 35 U.S.C. 154(b) by 0 days.

(21) Appl. No.: 10/481,838

(22) PCT Filed: Jun. 26, 2002

(86) PCT No.: PCT/US02/20283

§ 371 (c)(1),
(2), (4) Date: Dec. 23, 2003

(87) PCT Pub. No.: WO03/002897

PCT Pub. Date: Jan. 9, 2003

(65) Prior Publication Data

US 2004/0187939 A1 Sep. 30, 2004

Related U.S. Application Data

(60) Provisional application No. 60/300,961, filed on Jun. 26, 2001.

(51) Int. Cl.[7] .............................................. F16K 11/14
(52) U.S. Cl. .................. 137/870; 137/871; 251/129.17; 251/902
(58) Field of Search ................................ 137/870, 871; 251/129.17, 902

(56) References Cited

U.S. PATENT DOCUMENTS

| 3,160,071 A | 12/1964 | Kandelman |
| 3,169,550 A | 2/1965 | Reader |
| 3,896,834 A | 7/1975 | Paul, Jr. |
| 4,741,365 A | 5/1988 | Van Ornum |
| 4,905,798 A | 3/1990 | Engelsdorf et al. |

FOREIGN PATENT DOCUMENTS

DE          2856446          3/1980

*Primary Examiner*—Gerald A. Michalsky
(74) *Attorney, Agent, or Firm*—Calson, Gaskey & Olds

(57) ABSTRACT

Improved low flow impedance flow control valves are disclosed in the present invention wherein spring valve means (12) captured between a valve spool (28) and a shoulder (30) are utilized for selectively metering a flow of fluid from an inlet port (18) to an outlet port (14) via a round edged helical orifice (82) formed between the open coils of the spring valve (12) as a function of the instant axial position of the valve spool (28) and the differential pressure therebetween. An improved method of controlling low impedance flow control valves is also disclosed in the present invention. The improved method provides better accuracy in controlling fluid flow through low flow impedance flow control valves through continually cycling a means for substantially interrupting fluid flow therethrough in a low frequency pulse width modulated fashion.

3 Claims, 9 Drawing Sheets

> Provide a Fluid Flow Path wherein substantially all fluid to be selectively metered flows radially through a Round Edged Helical Orifice formed between coils of a Spring Valve > Reduce or increase the size of the Round Edged Helical Orifice by respectively compressing or allowing axial expansion of the Spring Valve

FIG. 5

> Provide at least one interruptible fluid flow path between a source and a selectable destination of fluid flow > Provide means for substantially interrupting fluid flow through a single such fluid flow path or alternately through either of multiple such fluid flow paths > Continually cycle the means for substantially interrupting fluid flow in a low frequency pulse width modulated fashion

FIG. 6

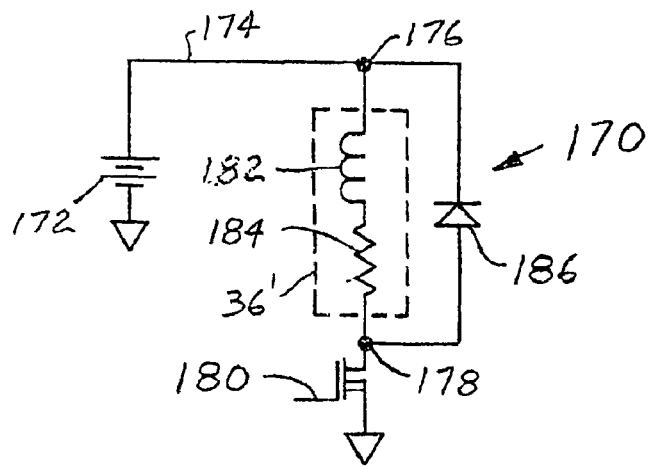

FIG. 7

SPRING VALVE IMPLEMENTED FLOW CONTROL VALVES

This application claims the benefit of Provisional application Ser. No. 60/300,961, filed Jun. 26, 2001.

BACKGROUND OF THE INVENTION

1. Field of the Invention

The present invention relates generally to hydraulic valves, and more particularly to improved low flow impedance two- and three-way flow control valves, wherein such two- and three-way flow control valves are optimized for controlling automotive engine heated coolant flow to a host vehicle's radiator, or between the radiator and a bypass line, or even to its heater core.

2. Description of the Prior Art

Flow control valves optimized for operation under conditions of low flow impedance are known in the prior art. One such prior art three-way flow control valve is manufactured by Spartan Peripheral Devices of Vaudreuil, Quebec, Canada. This three-way flow control valve has an axially oriented inlet port and first and second radially oriented output ports. It has a valve spool configured in a generally round thin walled cylindrical manner and has a central web for structural stability and connection to a valve stem. The valve spool is configured with a round outer periphery terminated by first and second orthogonal ends that serve as metering edges.

Fluid conveyed from the inlet port to the first output port merely passes through a first annular orifice formed between the first orthogonal end and a first bulkhead formed as part of an input fitting. On the other hand, fluid conveyed from the inlet port to the second output port must first pass through the valve spool itself and then pass through a second annular orifice formed between the second orthogonal end and a second bulkhead formed as part of a bonnet. For this reason, the valve spool is formed with an internal flow channel between spokes of a web for conveying fluid from a first chamber formed within the first end to a second chamber formed within the second end.

The valve spool is slidingly located within a bore of minimal length located in a third bulkhead formed in the housing for separating the first and second output ports. The valve spool is positioned axially by a valve stem. The valve stem is mounted within a bore formed concentrically within the central web thereby forming a metering assembly comprising the valve spool and valve stem. In addition, the valve stem is slidingly located within a bore located concentrically within the bonnet. Thus, the metering assembly is provided with orthogonal radial position constraints at each of the first bulkhead formed in the housing and second bulkhead formed in the bonnet. A fifth positional constraint is provided by the axial positioning of the metering assembly itself while the sixth or rotational constraint about the axis of motion of the metering assembly is not required for proper functioning of the three-way valve.

Another prior art low flow impedance three-way flow control valve is disclosed in my Provisional U.S. patent application Ser. No. 60/220,340 filed on Jul. 24, 2000 and entitled "Three-Way Flow Control Valve Having Low flow Impedance". The '340 application discusses a low impedance three-way flow control valve utilized for controlling engine coolant flow between a radiator and a bypass line. In the low impedance three-way flow control valve disclosed in patent application '340, a valve spool apportions fluid flow between axially offset first and second flow receiving annular passages from a central flow distribution chamber. Similarly to the prior art three-way valve described above, the three-way flow control valve disclosed in patent application '340 is configured with an axially oriented inlet port and first and second output ports. However, in the three-way flow control valve disclosed in patent application '340, axially offset first and second flow receiving annular passages are respectively formed as inner portions of the first and second output ports. Further, the housing of the three-way flow control valve disclosed in patent application '340 is formed with its internal bore extending through sealing bulkheads formed on either side of the axially offset first and second flow receiving annular passages as well as a central housing bulkhead.

One negative aspect of either valve construction is practical difficulty in operating their valves with a proportional solenoid. Through extensive testing of the flow control valve disclosed in patent application '340, it has been found that impurities commonly found in automotive engine heated coolant tend to interfere with smooth operation of any juxtaposed sliding surfaces such as those found in any conventional valve or solenoid. This factor appeared to substantially doom the general concept of providing proportional solenoid controlled low flow impedance flow control valves unless a way of eliminating such juxtaposed sliding surfaces could be provided through implementation of improved low flow impedance flow control valves.

Further, it has also been found that the relatively high rate of fluid flow itself tends to interfere with maintenance of an axial force balance on the valve spool. This is because of the formation of vena contractas located slightly downstream of each of the annular orifices. As the axial position of the valve spool and/or the output port pressures vary, reaction forces generated by the vena contractas vary as well. This results in net axial force values being applied to the valve spool. In addition, the presence of the vena contractas means that the effective areas of the first and second annular orifices are significantly less than the apparent annular areas formed by the gaps at either end of the valve spool. The combination of these factors results in a requirement for a much stronger proportional solenoid having an approximately 50% longer stroke length than would be the case if a way of eliminating such vena contracta formation could be found for utilization in the improved low flow impedance flow control valves.

In addition, it has been found difficult to reliably regulate differential fluid flow between the radiator and bypass line as a function of valve spool position. This is because the flow impedance of each of the first and second annular orifices is similar to or even lower than the load impedance presented by either the radiator or the bypass line.

It would be advantageous to provide method and apparatus for controlling engine coolant flow between a radiator and bypass line where no vena contractas are formed with reference to flow control orifices and no juxtaposed sliding surfaces are exposed to engine heated coolant, and further, to provide a method of operation whereby engine coolant flow between the radiator and the bypass line is reliably regulated.

SUMMARY OF THE INVENTION

These and other objects are achieved in improved two- and three-way low flow impedance flow control valves according to the present invention, in which axially moving valve spools are supported by rolling diaphragms and actuate one or more spring valves formed generally in the manner of compression springs. The valve spools are utilized for axially positioning the inner end or ends of one or more spring valves with reference to a fixedly located opposite end or ends thereof, thereby apportioning fluid flow via one or more round edged helical orifices formed between individual spring coils amongst a like number of flow receiving generally annular chambers from a central flow distribution chamber or chambers.

Similarly to the prior art three-way valves, the two-way and a first type of three-way valve of the present invention are configured with an axially oriented inlet port and one or more radially oriented output passages leading to an output port or respective output ports. In addition, that three-way valve has a flow channel formed in its valve spool for conveying fluid flow from its inlet port and a first central flow distribution chamber formed within the first spring valve to a second central flow distribution chamber formed within the second spring valve.

In any of the flow control valves of the present invention, flow control is obtained by moving their valve spools axially thereby opening and/or closing the round edged helical spaces between the coils of the spring valves to form the round edged helical orifices. In the case of the three-way valves, the extent of valve stroke excursion is controlled by closure of either of the first and second spring valves while in the case of a two-way valve having only one spring valve, the extent of valve stroke excursion in one direction is controlled by closure thereof.

In the case of such a two-way valve, the rolling diaphragm used for supporting the valve spool is also utilized for fluidly isolating a back chamber located behind the valve spool from either of the radially oriented output passage and the outside environment. Pressure values on either side of the valve spool are balanced via a pressure balancing port formed in the valve spool. In order to substantially keep impurities out of the back chamber; a suitable filter is mounted in the pressure balancing port.

As in the prior art three-way valves, a proportional solenoid can be utilized for positioning the valve spools of the two- and three-way valves of the present invention. In order to prevent contamination however, the plunger cartridge is isolated from the back chamber by a differential rolling diaphragm.

In such proportional solenoid activated two- and three-way valves, spring valve generated force urges the valve spool towards the plunger and is opposed by force provided by the proportional solenoid. Thus, there is an abutting interface between plunger and valve spool whereby the plunger is enabled for positioning the valve spool. For convenience in compensating for practical manufacturing tolerances, means for fixedly locating the opposite end of the spring valve comprise an axially adjustable ring. The axially adjustable ring is positioned such that the round edged helical orifice of the spring valve is substantially closed when the proportional solenoid is nominally at its fully energized travel limit.

Improved low flow impedance two-way flow control valves may be utilized to replace the normally utilized thermostat in an intelligent cooling system, for a radiator bypass line leading directly back to the inlet port of the host cooling system's pump, and/or even for selectively distributing engine coolant flow to a heater core. In the case of the replacement of a thermostat, the engine cooling function is rendered inherently fail-safe as follows: Should the solenoid or its drive fail, the plunger would be driven back by the spring valve whereby the spring valve will be rendered fully open. Thus, in case of such a failure all coolant would be directed to the radiator.

In the case of a three-way valve activated by a proportional solenoid, the valve housing is formed with a central housing bulkhead separating first and second radially oriented output passages. A rolling diaphragm is used for supporting the valve spool and for fluidly isolating the first and second radially oriented output passages one from another. The first spring valve of the three-way valve is configured with stronger compression force than the second spring valve whereby the difference in compression forces between the first and second spring valves urges the valve stem and spool towards its plunger. Thus, there is an abutting interface between plunger and valve stem whereby the plunger is enabled for positioning the valve spool in the manner described above.

An axially adjustable ring is used for fixedly locating the opposite end of the first spring valve. In this case however, the axially adjustable ring is positioned such that a selected sum of axial opening values of the first and second round edged helical orifices is achieved. The valve stem is threadably attached to the valve spool whereby the valve stem is relatively positioned such that the round edged helical orifice of the first spring valve is substantially closed when the proportional solenoid is fully energized.

The improved low flow impedance three-way flow control valve is primarily intended for use in a highly sophisticated intelligent cooling system wherein engine coolant flow is selectively distributed between a radiator line leading to the input fitting on the host vehicle's radiator, and a radiator bypass line leading to a centrifugal pump inlet wherein the radiator line is connected to a first port and the radiator bypass line is connected to a second port. This arrangement is preferred because it is inherently fail-safe. Should the solenoid or its drive fail, the stronger first spring valve would fully open and drive the second spring valve closed along with the plunger. Thus, in case of such a failure all coolant would be directed to the radiator.

Interestingly, in the case of a two-way valve utilized in conjunction with a radiator bypass line the above-described fail-safe function must be inverted. Generally such a radiator bypass line is used in conjunction with a two-way valve controlling coolant flow to a host vehicle's radiator. As already described, the proper fail-safe condition is for all coolant to flow through the radiator whereby it is clear that the fail-safe condition for the two-way valve utilized in conjunction with a radiator bypass line is for that valve to close rather than open. Such a two-way valve could be termed a normally closed two-way valve. In any case, this problem is readily solved by utilizing the improved low flow impedance three-way valve with output flow from its first radially oriented output passage blocked by the simple expedient of not providing a first output port. Then the fail-safe condition is implemented by stopping electrical current flow to the proportional solenoid.

The valve spools utilized in the flow control valves of the present invention avoid the deleterious effects of Coulomb friction primarily because they are located by rolling diaphragms. Further, the spring valves effect flow metering via closure of the round edged helical orifices rather than via closure of sharp edged orifices. As a result, no vena contractas are formed with respect to fluid flow through the round edged helical orifices. This results in minimal stroke length and absence of unwanted axial force components for the spring valves. These factors combine to result in minimal size and drive power for the proportional solenoids. Further, because of the lack of Coulomb friction it is possible to control valve spool displacement without position feedback.

These factors have in part been enabled by a new method of selective flow metering via closure of round edged helical orifices formed between coils of spring valves comprising: providing a fluid flow path wherein substantially all fluid to be selectively metered flows radially through a round edged helical orifice formed between coils of a spring valve; and reducing or increasing the size of that round edged helical orifice by respectively compressing or allowing axial expansion of the spring valve.

As mentioned above however, it has been found difficult to reliably regulate differential fluid flow between the radiator and radiator bypass line as a function of valve spool position. Again, this is because the flow impedance of each of the first and second annular orifices is similar to the load impedance presented by either of the radiator or bypass lines. In addition, it may prove necessary to periodically clear debris from the round edged helical orifices.

Both of these problems can easily be resolved according to a new method of operating any of the improved low flow impedance flow control valves as a "bang-bang" servo wherein in the case of a flow control valve comprising a single orifice that orifice is continually cycled between fully open and closed positions in low frequency pulse width modulated fashion, or in the case of a flow control valve comprising more than one orifice those orifices are alternately continually cycled between fully open and closed positions in low frequency pulse width modulated fashion. In the later case for instance, the regulation of differential fluid flow between the radiator and radiator bypass line via the improved low flow impedance three-way flow control valve is accomplished by directly controlling the fraction of time when all engine coolant flow passes through the radiator vs. the remaining fraction of time when all engine coolant flow passes through the radiator bypass line.

In general, the new method of controlling low impedance flow control valves comprises: providing at least one interruptible fluid flow path between a source and a selectable destination of fluid flow; providing means for substantially interrupting fluid flow through a single such fluid flow path, or alternately through either of multiple such fluid flow paths; and continually cycling the means for substantially interrupting fluid flow in a low frequency pulse width modulated fashion.

Traditional in-line design has been implied in the so far described improved low flow impedance two- and three-way flow control valves. However, this is by no means a requirement for implementing the new method of selective flow metering. Because of the self-centering nature of spring valves it is possible to utilize a pair of lever coupled and oppositely directed two-way spring valves in implementing a further simplified second type of low flow impedance three-way flow control valve. To differentiate it from the first type thereof, it will be termed a three-way flow control valve assembly hereinafter. Similarly to the first type of three-way flow control valve, a first output passage fluidly communicates with a radiator input line while a second output passage fluidly communicates with a radiator bypass line.

The bang-bang servo mode of control is utilized in the three-way flow control valve assembly thereby obviating any requirement for a proportional or push-type solenoid. A standard pull-type solenoid is quite suitable. These factors are utilized advantageously hereinbelow in implementing a low flow impedance three-way flow control valve assembly that is fully integrated together with a centrifugal pump within a common housing that can, if desired, be directly mounted on an automotive engine.

A pair of two-way spring valves is radially disposed with reference to a single central flow distribution port in the three-way flow control valve assembly. The individual two-way spring valves function generally as poppet valves in selectively controlling engine coolant flow to first and second generally annular passages respectively fluidly coupled to the radiator input and radiator bypass lines mentioned above. Each of their valve heads is sealed by a rolling diaphragm. As in the three-way valve previously described, the first one of the two-way spring valves utilizes a stronger spring than the second one so that the fail safe mode results in all coolant flow going to the radiator. The valve heads are axially located by cam followers mounted on a lever. The lever is actuated by a simple linkage-coupled pull-type solenoid against the differential force provided by the springs.

The radiator bypass line is implemented as a bypass passage that directly fluidly couples the second generally annularly oriented output chamber of the three-way flow control valve assembly with an input chamber of the centrifugal pump. The centrifugal pump can be driven either by the engine's accessory drive belt or by an electric motor, and is used to drive coolant through the engine's coolant passages and the coolant system as a whole. The three-way flow control valve assembly is used to selectively divide coolant flow issuing from the engine coolant passages between the radiator input line and the bypass passage.

In passing it is worth noting that it would also be possible to implement an alternate low flow impedance three-way flow control valve assembly generally constructed according to the above described architecture wherein the spring-valves are replaced by mechanical metering edges. In this case the valve heads are formed with orthogonal ends that serve directly as the metering edges. Further, the valve heads are fixedly attached to the lever, which lever acts against a dedicated return spring utilized for urging the valve heads and solenoid plunger toward their fail safe positions.

In a first aspect, then, the present invention is directed to an improved low flow impedance two-way flow control valve of the type having a housing; an axially oriented inlet port located within a first end of the housing; an annularly oriented radial output passage disposed within the housing proximate to its first end; and an axially moving valve spool, wherein the improvement comprises: a rolling diaphragm located proximate to the second end of the housing for fluidly isolating the annularly oriented radial output passage from a back chamber formed behind the valve spool and constraining the valve spool for axial movement within the housing; and spring valve means captured between the valve spool and a shoulder located within the first end of the housing for selectively metering a flow of fluid from the inlet port to the output passage via a round edged helical orifice formed between the open coils of the spring valve as a function of the instant axial position of the valve spool and the differential pressure therebetween.

In a second aspect, the present invention is directed to a particular combination of the elements identified above. More particularly in this second aspect, the present invention is directed to the improved low flow impedance two-way flow control valve of the first aspect additionally comprising: a proportional solenoid for axially positioning the valve spool via a push type plunger thereof; a pressure balancing port formed in the valve spool for conveying fluid from the inlet port to the otherwise nominally sealed back chamber for balancing fluid pressure values on either side of the valve spool; a filter mounted in the pressure balancing port for substantially keeping impurities out of the back chamber; a differential rolling diaphragm located proximate to the proportional solenoid for fluidly isolating the plunger cartridge of the proportional solenoid from any possible contamination by coolant present within the back chamber; and further wherein the shoulder is configured as part of an axially adjustable ring for positioning the shoulder such that the round edged helical orifice of the spring valve is substantially closed when the proportional solenoid is fully energized thereby positioning the plunger at its nominal travel limit.

In a third aspect, the present invention is directed to an improved low flow impedance three-way flow control valve of the type having a housing; an axially oriented inlet port located in a first end of the housing; first and second annularly oriented radial output passages disposed within the housing and fluidly isolated one from another by a central housing bulkhead, the first annularly oriented radial output passage being located proximate to a first end of the housing and the second annularly oriented radial output passage being located proximate to the second end of the housing; and an axially moving valve spool, the valve spool being positioned by a valve stem and including an axially oriented flow channel, wherein the improvement comprises: a rolling diaphragm located proximate to the central housing bulkhead for fluidly isolating the radially oriented output passages one from another and constraining the valve spool for axial movement within the housing; first spring valve means captured between the valve spool and a shoulder located within the first end of the housing for selectively metering a flow of fluid from the inlet port to the first output passage via a round edged helical orifice formed between the open coils of the first spring valve as a function of the instant axial position of the valve spool and the differential pressure therebetween; and second spring valve means captured between the valve spool and the second end of the housing for selectively metering a flow of fluid from the inlet port to the second output passage via the flow channel and a round edged helical orifice formed between the open coils of the second spring valve as a function of the instant axial position of the valve spool and the differential pressure therebetween.

In a fourth aspect, the present invention is directed to a particular combination of the elements identified above. More particularly in this fourth aspect, the present invention is directed to the improved low flow impedance three-way flow control valve of the third aspect additionally comprising: a proportional solenoid for axially positioning the valve stem and valve spool via a push type plunger thereof; the first spring valve means being configured with stronger compression force than the second spring valve means for urging the valve stem and valve spool towards the plunger; a differential rolling diaphragm located proximate to the proportional solenoid for fluidly isolating the plunger cartridge of the proportional solenoid from engine heated coolant generally present within the two-way flow control valve; the shoulder being configured as part of an axially adjustable ring for positioning the shoulder such that a selected sum of axial opening values of the first and second round edged helical orifices is achieved; and means for adjustably attaching the valve stem to the valve spool for relative axial positioning thereof after the axially adjustable ring has been properly positioned, such that the round edged helical orifice of the first spring valve is substantially closed when the proportional solenoid is fully energized thereby positioning the plunger at its nominal travel limit.

In a fifth aspect, the present invention is directed to a particular combination of the elements identified above. More particularly in this fifth aspect, the present invention is directed to the improved low flow impedance three-way flow control valve of the third aspect modified by blocking output flow from its first radially oriented output passage via the simple expedient of not providing an output port therefore so as to reconfigure the improved low flow impedance three-way flow control valve as a normally closed two-way valve.

In a sixth aspect, the present invention is directed to a new method for selective flow metering comprising the steps of: providing a fluid flow path wherein substantially all fluid to be selectively metered flows radially through a round edged helical orifice formed between coils of a spring valve; and reducing or increasing the size of that round edged helical orifice by respectively compressing or allowing axial expansion of the spring valve.

In a seventh aspect, the present invention is directed to a new method for controlling low impedance flow control valves comprising: providing at least one interruptible fluid flow path between a source and a selectable destination of fluid flow; providing means for substantially interrupting fluid flow through a single such fluid flow path or alternately through either of multiple such fluid flow paths; and continually cycling the means for substantially interrupting fluid flow in low frequency pulse width modulated fashion.

In an eighth aspect, the present invention is directed to an improved low flow impedance three-way flow control valve assembly comprising: first and second coupled and oppositely directed two-way valves; respective first and second generally annularly oriented output passages for receiving selectively apportioned engine coolant flow from the first and second two-way valves; a lever for mechanically coupling and physically driving the first and second two-way valves; and means for mechanically driving the lever.

In a ninth aspect, the present invention is directed to a particular combination of the elements identified above. More particularly in this ninth aspect, the present invention is directed to the improved low flow impedance three-way flow control valve of the eighth aspect, additionally comprising: two-way spring valves utilized for the first and second coupled and oppositely directed two-way valves; a pull-type solenoid utilized as the means for mechanically driving: respective first and second valve heads for actuating the springs comprised in the spring valves; and respective first and second rolling diaphragms for fluidly isolating the lever and pull-type solenoid from the engine coolant.

In a tenth aspect, the present invention is directed to a particular combination of the elements identified above. More particularly in this tenth aspect, the present invention is directed to the improved low flow impedance three-way flow control valve of the eighth aspect, additionally comprising: mechanical metering edges utilized for the first and second coupled and oppositely directed two-way valves; a pull-type solenoid utilized as the means for mechanically driving: respective first and second valve heads mechanically coupled to the lever and comprising the mechanical metering edges; and respective first and second rolling diaphragms for fluidly isolating the lever and pull-type solenoid from the engine coolant.

In an eleventh and final aspect, the present invention is directed to a fully integrated pump-valve assembly comprising the low flow impedance three-way flow control valve assembly of the eighth aspect, and additionally comprising a centrifugal pump, wherein the valve assembly and its associated flow passages are housed and included along with the centrifugal pump and a bypass passage for fluidly coupling the second generally annularly oriented output passage of the three-way flow control valve assembly with an input chamber of the centrifugal pump within a common housing that can be directly mounted on an automotive engine.

BRIEF DESCRIPTION OF THE DRAWINGS

A better understanding of the present invention will now be had with reference to the accompanying drawing, wherein like reference characters refer to like parts throughout the several views herein, and in which:

FIG. 5 is a flow chart depicting a method for adjustably varying fluid flow through the low flow impedance valves of the present invention;

FIG. 6 is a flow chart depicting a method for operation of any of the improved low flow impedance flow control valves of the present invention in the manner of a "bang-bang" servo;

FIG. 7 is a schematic diagram illustrating a circuit useful in implementing the method of FIG. 6;

DETAILED DESCRIPTION OF THE PREFERRED EMBODIMENT

Figure 1:
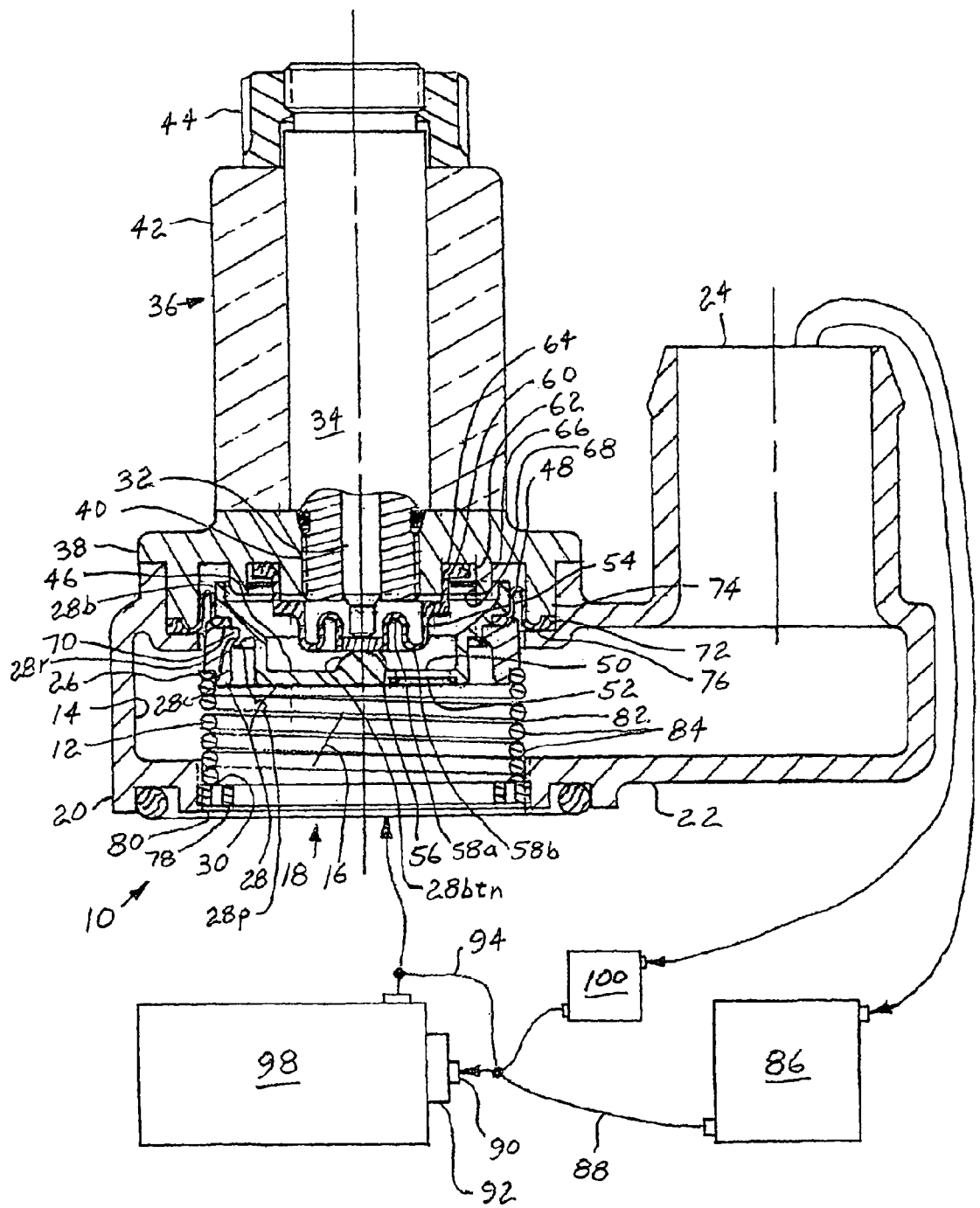
FIG. 1 is a partially schematic sectional view of an improved low flow impedance two-way flow control valve of the present invention.

With reference now to FIG. 1, thereshown in a partially schematic sectional view is improved low flow impedance two-way flow control valve 10. In the two-way flow control valve 10 a spring valve 12 having squared and ground ends apportions fluid flow to an annularly oriented radial output passage 14 from a central flow distribution chamber 16. Incoming fluid is provided directly to the flow distribution chamber 16 from an axially oriented inlet port 18 formed at a first end 20 of housing 22 while a flow of output fluid is disbursed from an output port 24 fluidly communicating with the annularly oriented radial output passage 14. The spring valve 12 is disposed between a shoulder 26 formed on the leading edge of a valve spool 28 and another shoulder 30 located within the inlet port 18. The valve spool 28 is driven in an axial direction by the push type plunger 32 of a plunger cartridge 34 comprised within a proportional solenoid 36. The plunger cartridge 34 is directly mounted in a back plate 38 (attached to the housing 22 via bolts—not shown) in a standard manner via a straight tube boss 40 while a coil 42 is mounted upon the plunger cartridge 34 and then urged into contact with the back plate 38 by a retaining nut 44.

The annularly oriented radial output passage 14 is fluidly isolated from a back chamber 46 formed behind the valve spool 28 by a rolling diaphragm 48. Pressure values on either side of the valve spool 28 are balanced by a pressure balancing port 50 formed in the valve spool 28. In order to substantially keep impurities out of the back chamber 46; a filter 52 is mounted in the pressure balancing port 50. And in order to prevent any possible contamination by the coolant, the plunger cartridge 34 is isolated from the back chamber 46 by a differential rolling diaphragm 54.

The differential rolling diaphragm 54 comprises a nose plate 56 formed from a rigid material for effectively conveying plunger displacement to a button 28*btn* formed on the valve spool 28. Immediately surrounding the nose plate 56 are first and second annular convolutions 58*a* and 58*b* formed of an elastomeric material. This in effect forms two concentric pistons respectively equal in diameter to the roots of either of the first and second annular convolutions 58*a* and 58*b*. The concept of the differential rolling diaphragm 54 is that whenever the plunger 32 moves, the first annular convolution 58*a* and its effective piston is displaced as well. Then fluid on either side of the differential rolling diaphragm 54 is also displaced in such a manner as to displace the second annular convolution 58*b* and its effective piston in the opposite direction in a volumetrically equal manner such that there is substantially no pressure buildup within the plunger cartridge 34. The outer periphery of the differential rolling diaphragm 54 is formed with an annular sealing ridge 60 disposed within an annular shell 62. In assembly the annular sealing ridge 60 is compressed against a recessed face 64 of the back plate 38 by pressing a retaining ring 66 commonly known as a circular push-on against the annular shell 62. Outer teeth formed on the retaining ring 66 then retain the outer periphery of the differential rolling diaphragm 54 against the recessed face 64 by an interference fit with bore 68. Suitable circular push-on retaining rings for this purpose are available from Waldes Truarc of Millburn, N.J.

An inner annular bead 70 of the rolling diaphragm 48 is sealingly afixed to the valve spool 28 via compression between valve spool body 28*b* and valve spool ring 28*r* portions thereof during assembly. The valve spool ring 28*r* is so retained on the valve spool body 28*b* by displacing an annular protrusion 28*p* against a conical surface 28*c* of the valve spool ring 28*r*. An outer annular bead 72 of the rolling diaphragm 48 is sealingly trapped between an annular protruding ring 74 formed on the back plate 38 and a shoulder 76 formed on the housing 22. Suitable rolling diaphragms for this purpose are available from Bellofram of Newell, W.Va.

For convenience in compensating for practical manufacturing tolerances, the shoulder 30 is made axially adjustable by virtue of being configured as the near end of an adjustment ring 78 threadingly inserted in threads 80 formed in the housing 22. During assembly of the improved two-way flow control valve 10, the proportional solenoid 36 is axially positioned a selected small distance from its internal closed physical stop (not shown) and the axial position of the adjustment ring 78 is adjusted such that the round edged helical orifice 82 formed between the coils 84 of the spring valve 12 is nominally closed. Then the adjustment ring 78 is staked in position. Thus, the round edged helical orifice 82 can be modulated in size between a nominally closed value effected when the proportional solenoid 36 is fully energized, and a maximally open value as determined by solenoid stroke to its internal open physical stop (also not shown) as energized by force provided by the spring valve 12. Substantially force balanced operation is provided by selected values of plunger force opposed by compressive force from the spring valve 12 through its range of axial positions. In practice this is accomplished by modulating electrical current flowing through the solenoid 36 according to known current to plunger force conversion values.

As depicted in the partially schematic sectional view presented in FIG. 1, the improved low flow impedance two-way flow control valve 10 of the present invention is primarily intended for use in selectively conveying engine coolant flow to a radiator 86 in place of a thermostat in an intelligent cooling system. Then an input line 88 returns the coolant coming from the radiator 86 to the inlet port 90 of an engine driven centrifugal pump 92. In addition, a bypass line 94 may be provided for conveying a nominal amount of coolant directly to the inlet port 90 without passing through the radiator 86. This may be necessary in order to avoid hot spots when the improved low flow impedance two-way flow control valve 10 is closed. In any case, coolant issuing from output port (not shown) of the centrifugal pump 92 next flows through engine 98 and is eventually returned to the inlet port 18 and the bypass line 94.

As implied above, the improved low flow impedance two-way flow control valve 10 of the present invention could also be used for selectively conveying engine coolant flow to a heater core 100. In such a case engine heated coolant is conveyed from the output port 24 to the heater core 100. To complete the heater coolant flow circuit, coolant issuing from the heater core 100 is returned to the inlet port 90 of the centrifugal pump 92.

Figure 2A:
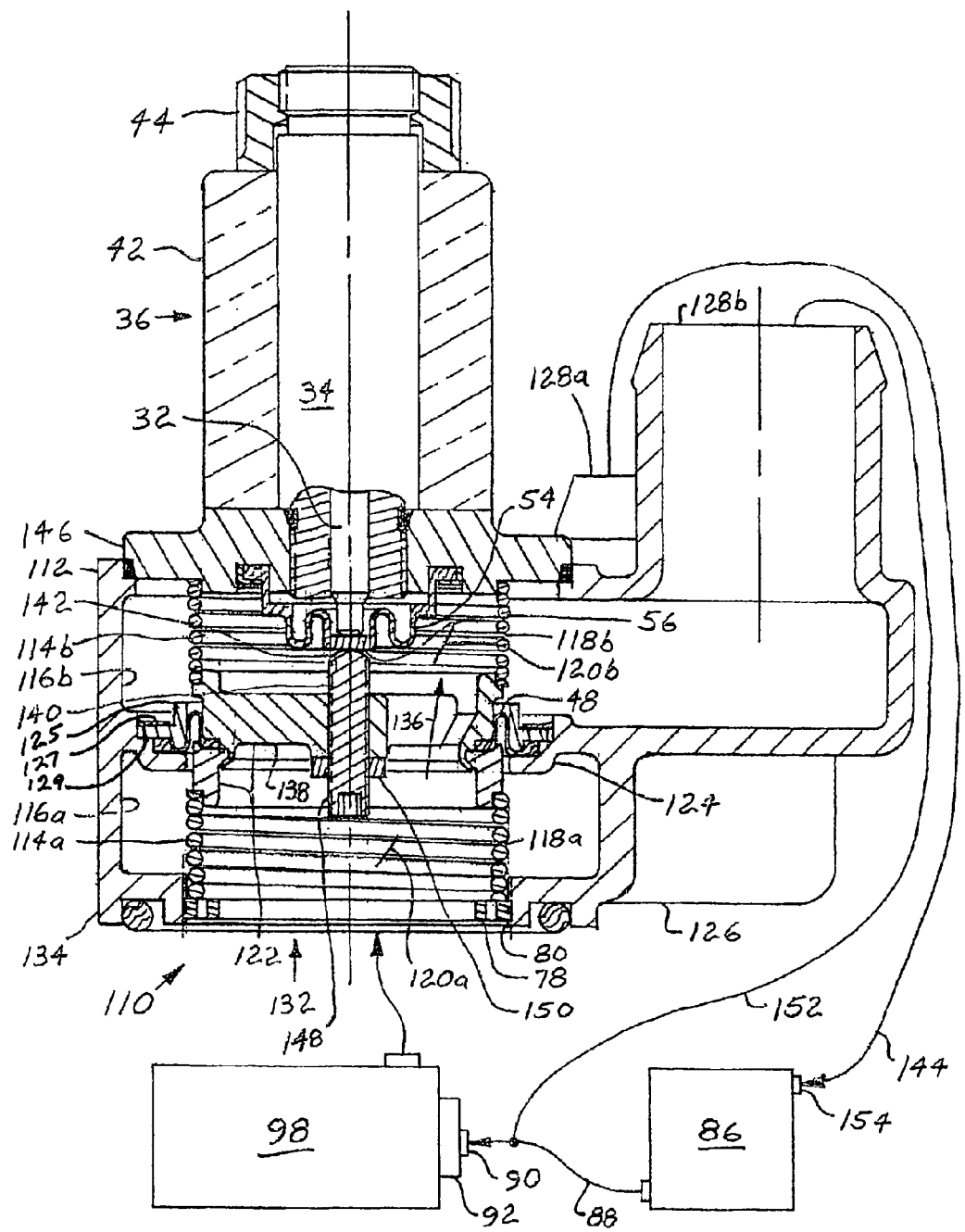
FIGS. 2A and 2B are partially schematic sectional views of an improved low flow impedance three-way flow control valve of the present invention.
Figure 2B:
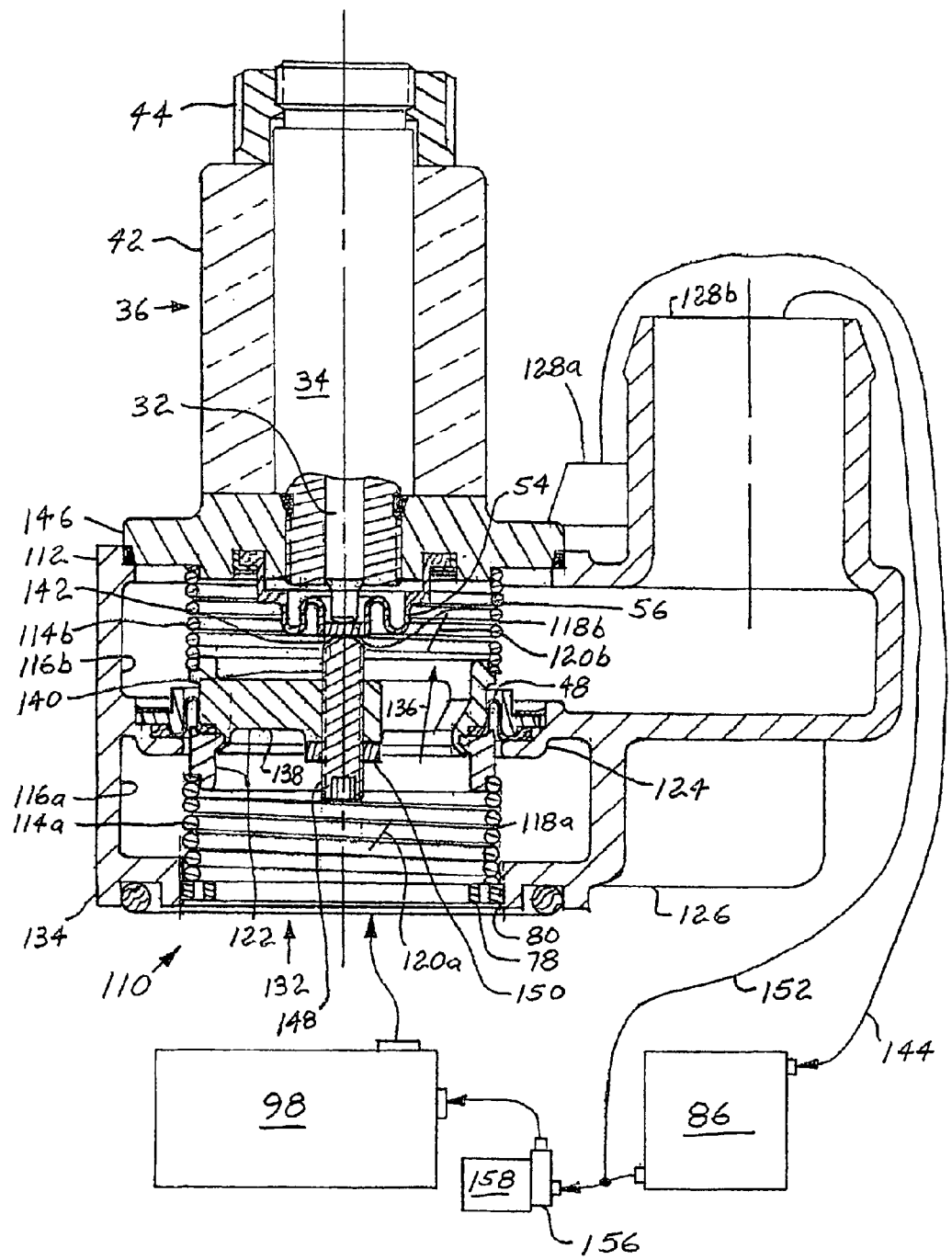
Figure 3:
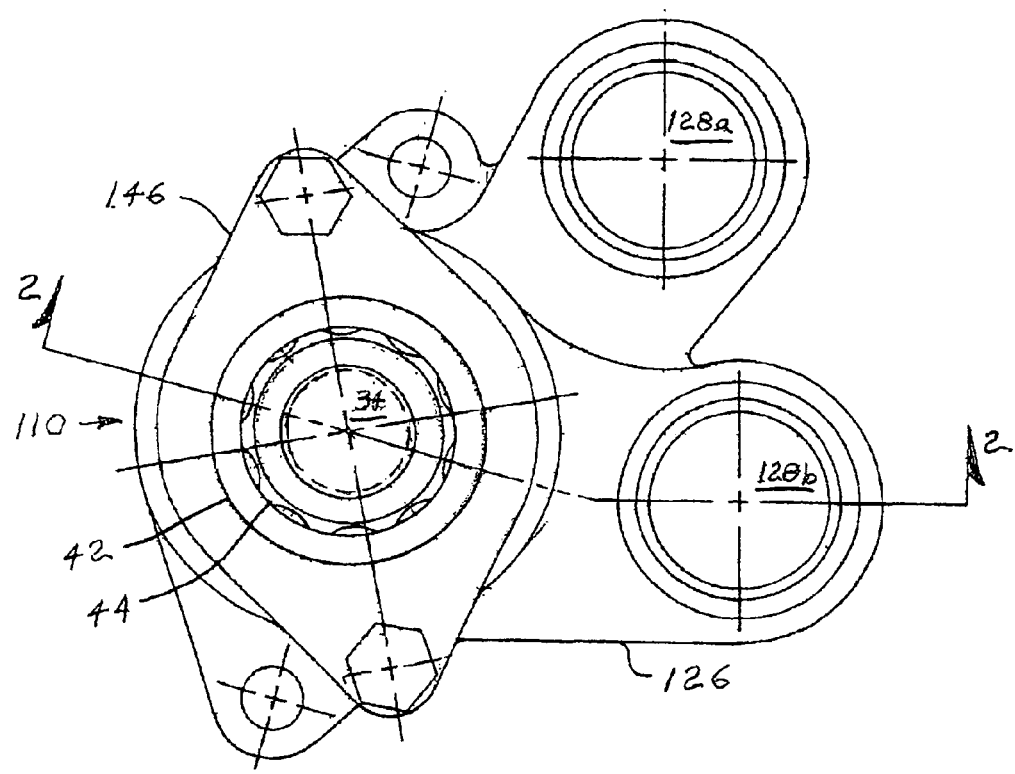
FIG. 3 is a plan view of the three-way flow control valve of the present invention.

With reference now to FIGS. 2A, 2B and 3, thereshown in partially schematic sectional and plan views is improved low flow impedance three-way flow control valve 110. In the improved three-way flow control valve 110, first and second spring valves 114a and 114b respectively apportion fluid flow to first and second annularly oriented radial output passages 116a and 116b via first and second round edged helical orifices 118a and 118b from first and second central flow distribution chambers 120a and 120b defined in part by a valve spool 122. The first and second annularly oriented radial output passages 116a and 116b are respectively located proximate to first and second ends 134 and 112 of housing 126 and are physically separated one from another by a bulkhead 124 formed therein. As in the two-way flow control valve 10, the valve spool 122 is radially located by the rolling diaphragm 48 utilized in this case to provide fluid isolation between the first and second annularly oriented radial output passages 116a and 116b. This time the outer periphery of the differential rolling diaphragm 48 is retained by a cylinder ring 125 and a circular push-on retaining ring 127 against a shoulder 129 formed in the bulkhead 124. The first and second annularly oriented radial output passages 116a and 116b fluidly communicate with first and second output ports 128a and 128b, respectively, wherefrom respective first and second flows of output fluid are disbursed.

The valve spool 122 is utilized to differentially position the inner ends of the first and second spring valves 114a and 114b such that as either round edged helical orifice 118a or 118b opens the other closes. Incoming fluid is provided directly to the first flow distribution chamber 120a from an axially oriented inlet port 132 formed at a first end 134 of the housing 126. Fluid is provided to the second flow distribution chamber 120b from the first flow distribution chamber 120a via a flow channel 136 comprising multiple passages between individual spokes of a central web structure 138 of the valve spool 122.

The first spring valve 114a is disposed between the valve spool 122 and a shoulder provided by the adjustment ring 78 threadingly inserted in threads 80 formed in the housing 126 proximate to the inlet port 132. In addition, a valve stem 140 is threadingly coupled to the valve spool 122. A radiused end 142 of the valve stem 140 is axially positioned by the nose plate 56 of differential rolling diaphragm 54 in response to motions of the plunger 32. The first and second spring valves 114a and 114b are configured such that the first spring valve 114a has a higher value of axial force than the second spring valve 114b throughout their range of motion in order to guarantee forcible contact between the valve stem 140, nose plate 56 and plunger 32. Substantially force balanced operation is provided by selected values of plunger force opposed by differential compressive force from the first and second spring valves 114a and 114b through their range of axial positions. In practice this is accomplished by modulating electrical current flowing through the solenoid 36 according to known current to plunger force conversion values.

Similarly to the two-way flow control valve 10, the plunger cartridge 34 is directly mounted in a back plate 146 and the coil 42 is mounted upon the plunger cartridge 34 and then urged into contact with the back plate 146 by the retaining nut 44. In this case however, the adjustment ring 78 is axially adjusted such that a selected sum of axial opening values of the first and second round edged helical orifices 118a and 118b is achieved. The threaded near end 148 of the valve stem 140 is elongated in order to facilitate axial manipulation of the valve spool 122 during this assembly operation. As with the two-way flow control valve 10, the adjustment ring 78 is then staked in position. Then the proportional solenoid 36 is axially positioned a selected small distance from its internal closed physical stop (not shown) and the axial position of the valve stem 140 is adjusted such that the first round edged helical orifice 118a is closed. Finally, a lock nut 150 is utilized to lock the valve stem 140 in place.

Thus, the first and second round edged helical orifices 118a and 118b can be counter modulated in size between the first round edged helical orifice 118a being nominally closed and the second round edged helical orifice 118b being open as effected when the proportional solenoid 36 is fully energized; and the first round edged helical orifice 118a being open at a minimal proportional solenoid force value whereat the differential force provided by the first and second spring valves 114a and 114b substantially closes the second round edged helical orifice 118b.

As depicted in the partially schematic sectional view presented in FIG. 2A, the improved low flow impedance three-way flow control valve 110 of the present invention is intended for use in selectively distributing engine coolant flow between a radiator bypass line 152 connected to its second output port 128b and leading to the inlet port 90 of the centrifugal pump 92, and a radiator input line 144 connected to its first output port 128a and leading to an input fitting 154 on the radiator 86. In addition, the input line 88 returning coolant coming from the radiator 86 is also connected to the inlet port 90 of the centrifugal pump 92. As before, coolant issuing from centrifugal pump 92 flows through the engine 98 and on to the inlet port 132 of the three-way flow control valve 110. As depicted in all of FIGS. 1, 2A and 2B, the inlet ports 18 and 132 are optimized for direct attachment to a boss (not shown) on the engine 98.

The improved low flow impedance two- and three-way flow control valves 10 and 110 provide inherently fail-safe operation because either of the spring valve 12 or the combination of spring valves 114a and 114b urge respective valve spools 28 and 122 toward the nose plate 56 and plunger 32. Should the solenoid 36 or its drive fail, all coolant would be directed to the radiator 86.

Figure 4:
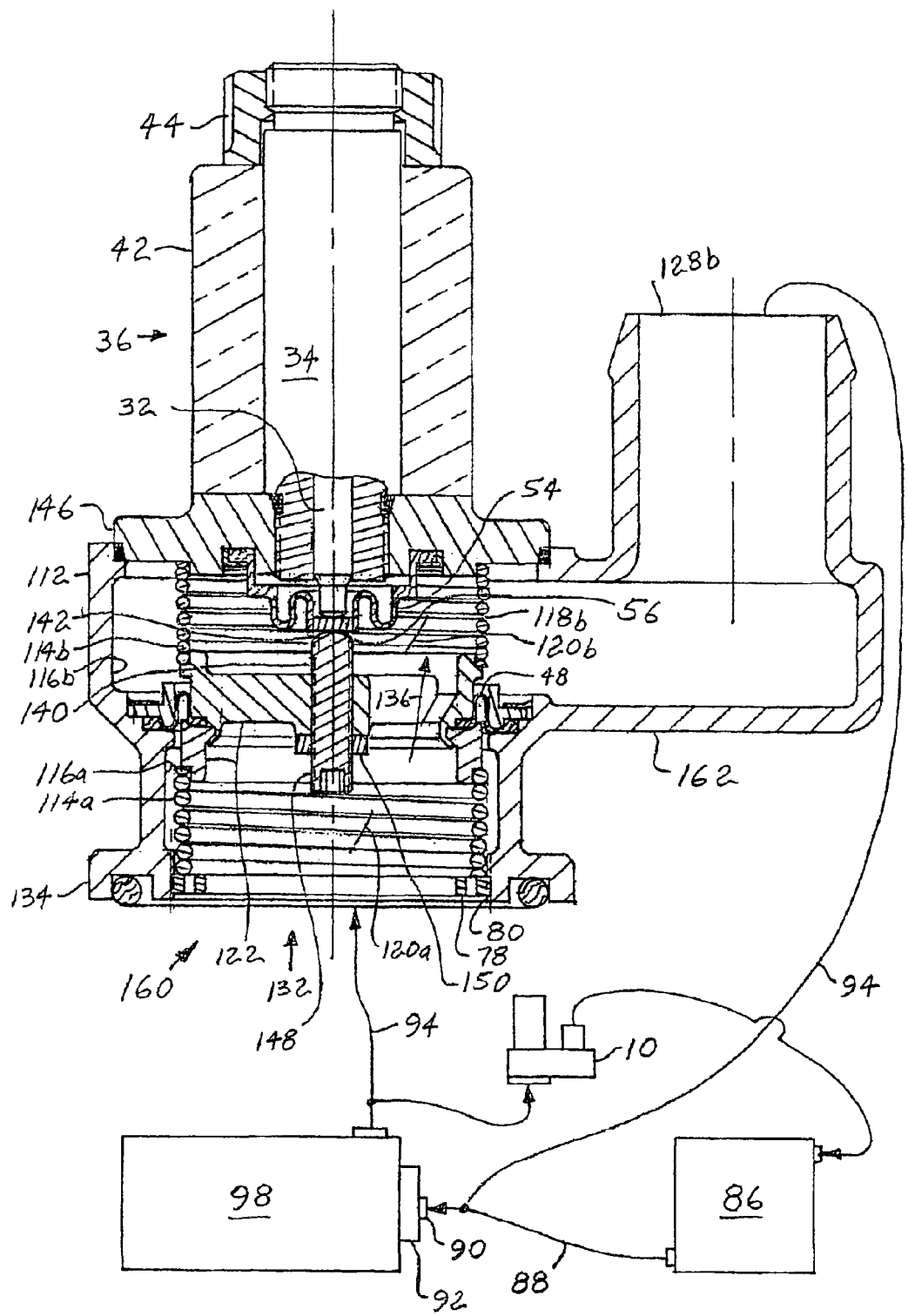
FIG. 4 is a partially schematic sectional view of a normally closed low flow impedance two-way flow control valve of the present invention.

As depicted in FIG. 4 however, if it is desired to utilize an improved two-way valve 160 in conjunction with the bypass line 94, the previously described fail-safe function must be inverted. Generally, such an inclusive bypass assembly would be used in conjunction with a two-way flow control valve 10 controlling coolant flow to the radiator 86. Because the proper fail-safe condition is for all coolant to flow through the radiator, it is clear that the fail-safe condition for the two-way valve 160 is for that valve to close rather than open. Thus the two-way valve 160 could be termed a normally closed two-way valve. In any case, this problem is readily solved by utilizing the improved low flow impedance three-way valve 110 with output flow from the first radially oriented output passage 116a blocked by the simple expedient of not providing a first output port 128a in a modified housing 162. Then the fail-safe condition is implemented by stopping electrical current flow to the proportional solenoid 36.

A primary advantage of using improved low impedance two- and three-way flow control valves of the present invention in place of present thermostats is that engine temperature may be intelligently controlled. For instance, an engine can be operated at elevated temperatures during part throttle operation and then cooled whenever increased power levels are demanded. Because of more efficient engine operation thus obtained, it has been estimated that fuel economy may be improved by as much as 2%. As depicted in FIG. 2B however, more complete intelligent cooling can be provided if the centrifugal pump 92 is replaced by driven by a purpose built centrifugal pump 156 driven by an electric motor 158. In that case, coolant flow can be matched to actual engine cooling demand. And in addition, because of greatly reduced engine accessory drive loading, this can result in truly meaningful improvement in overall operating efficiency and improvements in fuel economy approaching 4%.

In order to minimize the load on the electric motor 158, it is important to keep pressure drop through the associated improved two- or three-way flow control valve 10 or 110 to a minimum. At the same time, it is desirable to minimize both stoke length and hydraulically sourced axial loading for the comprised valve spool 28 or 122. In addition, it is also desirable to eliminate position feedback for the valve spool. Further, because of the lack of Coulomb friction it is possible to eliminate position feedback for the valve spool 28 or 122.

These goals are all accomplished in two- and three-way flow control valves 10 and 110 because the spring valves 12, 114a and 114b effect flow metering via closure of the round edged helical orifices 82, 118 and 118b, respectively, rather than via closure of sharp edged orifices. As a result, no vena contractas are formed with respect to fluid flow through the round edged helical orifices 82, 118 and 118b. This results in minimal flow resistance and the absence of axial force components for spring valves 12, 114a and 114b. The deleterious effects of Coulomb friction are also avoided because none of the rolling diaphragm 48, differential rolling diaphragm 54, or spring valves 12, 114a and 114b comprise sliding valve elements. All of these factors combine to result in minimal size and drive power for the proportional solenoids 36. These factors have been enabled by a new method of selective flow metering comprising closure of the round edged helical orifices 82, 118 and 118b formed between the coils of spring valves 12, 114a and 114b.

As depicted in FIG. 5 then, the new method for selective flow metering comprises the steps of: providing a fluid flow path wherein substantially all fluid to be selectively metered flows radially through a round edged helical orifice formed between coils of a spring valve; and reducing or increasing the size of that round edged helical orifice by respectively compressing or allowing axial expansion of the spring valve.

As mentioned above however, it has been found difficult to reliably regulate differential fluid flow between the radiator 86 and radiator bypass line 152 as a function of valve spool position. Again, this is because the flow impedance of each of the first and second round edged helical orifices 118a and 118b is similar to or even lower than the load impedance presented by either the radiator 86 or radiator bypass line 152. In addition, it is felt that it may prove necessary to periodically clear debris from the round edged helical orifices 82, 118a and 118b.

Both of these problems can easily be resolved according to a new method of operating any of the improved low flow impedance flow control valves 10, 110 and 160 as a "bang-bang" servo wherein in the case of a flow control valve comprising a single round edged helical orifice that orifice is continually cycled between fully open and closed positions in low frequency pulse width modulated fashion, or in the case of a flow control valve comprising more than one orifice those orifices are alternately continually cycled between fully open and closed positions in low frequency pulse width modulated fashion. In the later case for instance, the regulation of differential fluid flow between the radiator 86 and radiator bypass line 152 via the improved low flow impedance three-way flow control valve 110 is accomplished by directly controlling the fraction of time when all engine coolant flow passes through the radiator 86 vs. the remaining fraction of time when all engine coolant flow passes through the radiator bypass line 152.

In general as is depicted in FIG. 6, the new method of controlling low impedance flow control valves comprises: providing at least one interruptible fluid flow path between a source and a selectable destination of fluid flow; providing means for substantially interrupting fluid flow through a single such fluid flow path or alternately through either of multiple such fluid flow paths; and continually cycling the means for substantially interrupting fluid flow in a low frequency pulse width modulated fashion.

Utilizing the new method of controlling low impedance flow control valves depicted in FIG. 6 also eliminates the requirement for the solenoid 36 to be a proportional solenoid. Since control is binary in nature, non-proportional solenoid 36' must satisfy only two requirements. Firstly, it must generate enough force to move the valve spools 28 and 122. Secondly once in its activated position, it must continue to generate enough holding force to maintain activation. This simplifies the selection process for choosing the solenoid 36' and has the potential to reduce average electrical power requirements.

Depicted in FIG. 7 is circuit 170 whereby electrical power is delivered to the solenoid 36' from a battery 172 via buss 174, nodes 176 and 178, and FET 180. During initial turn-on, the FET 180 is fully turned on thereby accelerating current through solenoid inductance 182 and resistance 184. After initial turn-on, the FET 180 is pulse width modulated as required to complete and maintain activation of the solenoid 36' by providing sufficient average voltage values across the solenoid resistance 184. During the time periods when the FET 180 is in an off state, solenoid current is delivered from the node 178 back to the node 176 via a free-wheeling diode 186.

Figure 8:
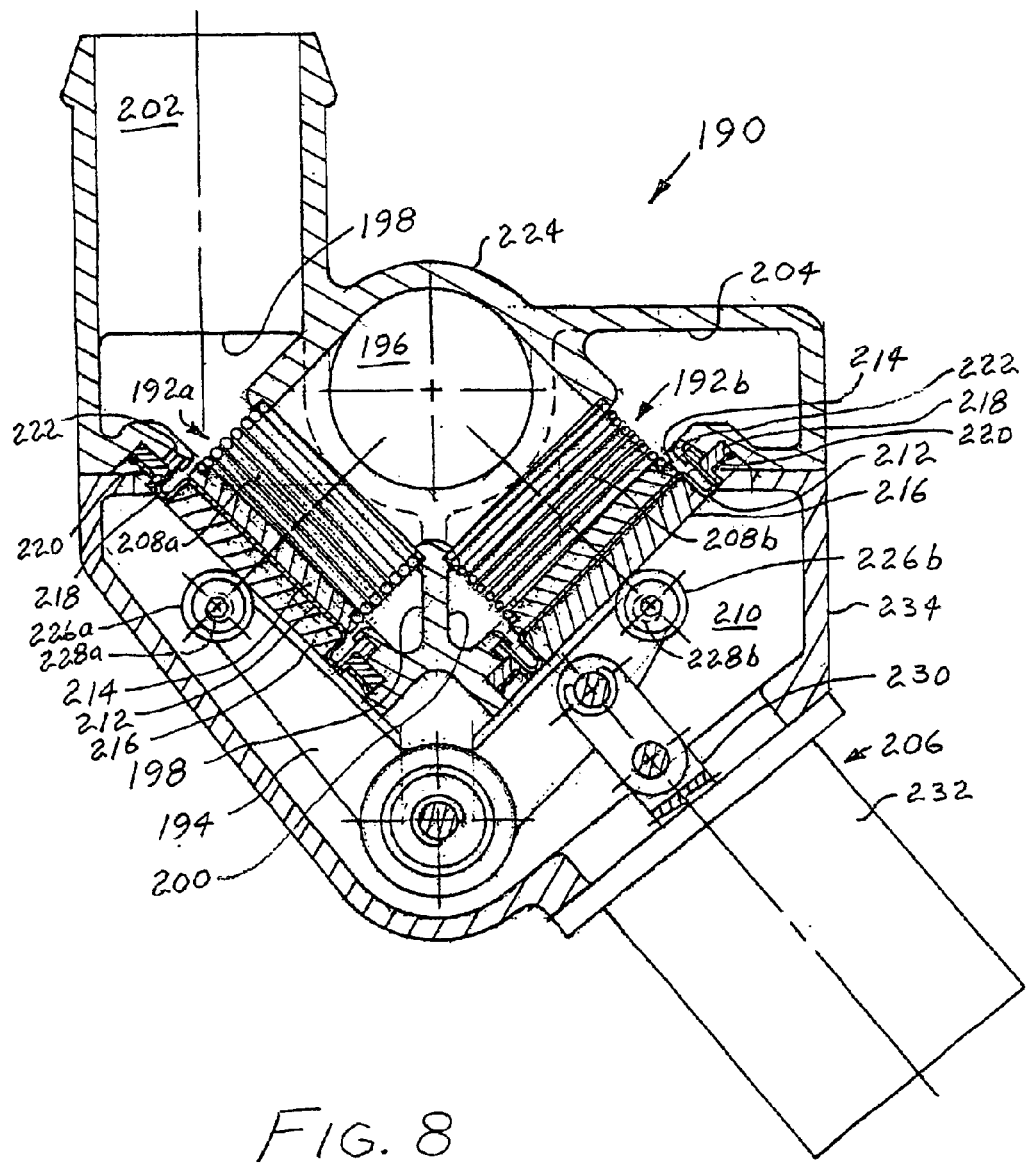
FIG. 8 is a sectional view of an improved low flow impedance three-way flow control valve assembly of the present invention.
Figure 9:
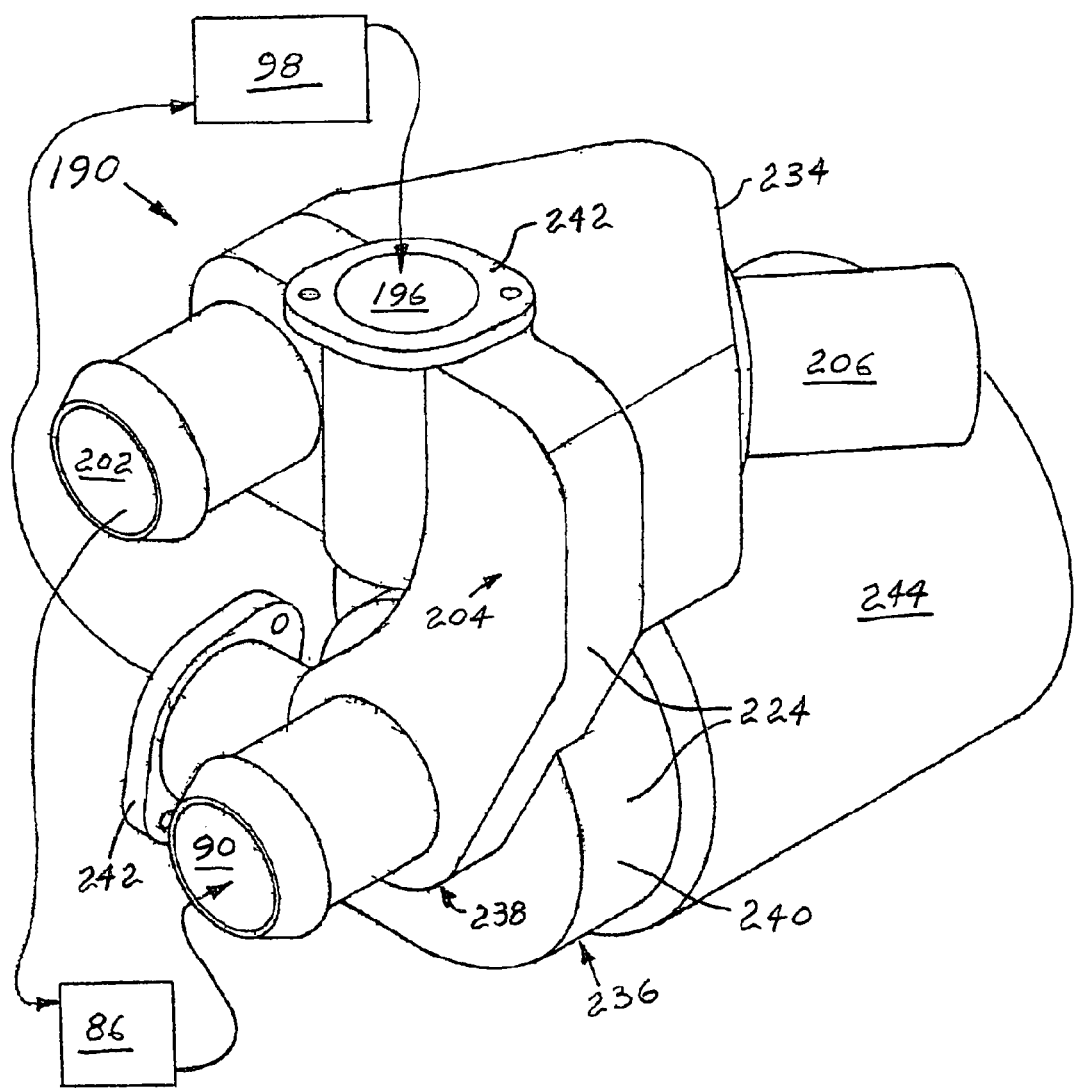
FIG. 9 is a partially schematic isometric view of the improved low flow impedance three-way flow control valve assembly shown in FIG. 8.

With reference now to FIGS. 8 and 9, thereshown in respective sectional and partially schematic isometric views is improved low flow impedance three-way flow control valve assembly 190. Traditional in-line design wherein a proportional solenoid is utilized to directly drive a valve spool is not required because of the self-centering nature of spring valves. In the three-way flow control valve assembly 190 a pair of oppositely directed first and second two-way spring valves 192a and 192b is mechanically coupled via a lever 194 and respectively utilized for selectively fluidly coupling a central flow distribution port 196 to a first generally annular output passage 198 and to a second generally annular output passage 200. In turn, the first output passage 198 fluidly communicates with a radiator output port 202 and the second output passage 200 fluidly communicates with a bypass passage 204.

The new method of controlling low impedance flow control valves enables the three-way flow control valve assembly 190 to be operated in a bang-bang servo mode. This obviates any requirement for a proportional solenoid whereby a simple linkage-coupled pull-type solenoid 206 is utilized to drive the lever 194. The first two-way spring valve 192a utilizes a stronger first spring 208a than a second spring 208b utilized in the second two-way spring valve 192b. This results in a fail safe mode wherein all coolant flowing from the central flow distribution port 196 goes to the radiator output port 202.

The first and second two-way spring valves 192a and 192b are radially disposed with reference to the central flow distribution port 196. Each two-way spring valve 192a and 192b functions generally as a poppet valve that is sealed from a back chamber 210 by a rolling diaphragm 212 juxtaposed between a valve head 214 and a valve piston 216. The outer periphery of each of the rolling diaphragms 212 is retained by a cylinder ring 218 and a circular push-on retaining ring 220 against a shoulder 222 formed in housing 224.

The valve pistons 216 are axially located by first and second cam followers 226a and 226b mounted on the lever 194. The lever 194 is actuated by the pull-type solenoid 206 against the differential force provided by the first and second springs 208a and 208b. Reasonable part tolerances are accommodated by configuring the first and second cam followers 226a and 226b with respective first and second eccentric studs 228a and 228b. During assembly, the first spring 208a is fully compressed and the first eccentric stud 228a is adjusted and locked in a position such that the plunger 230 of pull-type solenoid 206 is not quite at its outward stop position. After the first spring 208a is allowed to extend and compress the second spring 208b the second eccentric stud 228b is adjusted and locked in a position such that the overall travel distance of the lever 194 is properly attained. Then the body 232 of the pull-type solenoid 206 is mounted on cover 234 and that assembly is positioned over the plunger 230 and secured by bolts (not shown).

As most clearly shown in FIG. 9, the improved low flow impedance three-way flow control valve assembly 190 is fully integrated with a centrifugal pump 236 whereby outgoing coolant flow is directed toward radiator 86 via radiator output port 202 and returning coolant flow coming from the radiator is received via inlet port 90. Bypassed coolant flow is directed to an input chamber 238 of the centrifugal pump 236 via the bypass passage 204. As depicted in FIG. 9, the housing 224 combines the various elements of the three-way flow control valve assembly 190 and the centrifugal pump 236 including pump scroll 240 and the bypass passage 204. The housing 224 can be directly mounted to the engine 98 via either or both mounting flanges 242 if desired. The centrifugal pump 236 can be driven either by an electric motor 244 as shown or by an engine accessory drive belt (not shown).

Figure 10:
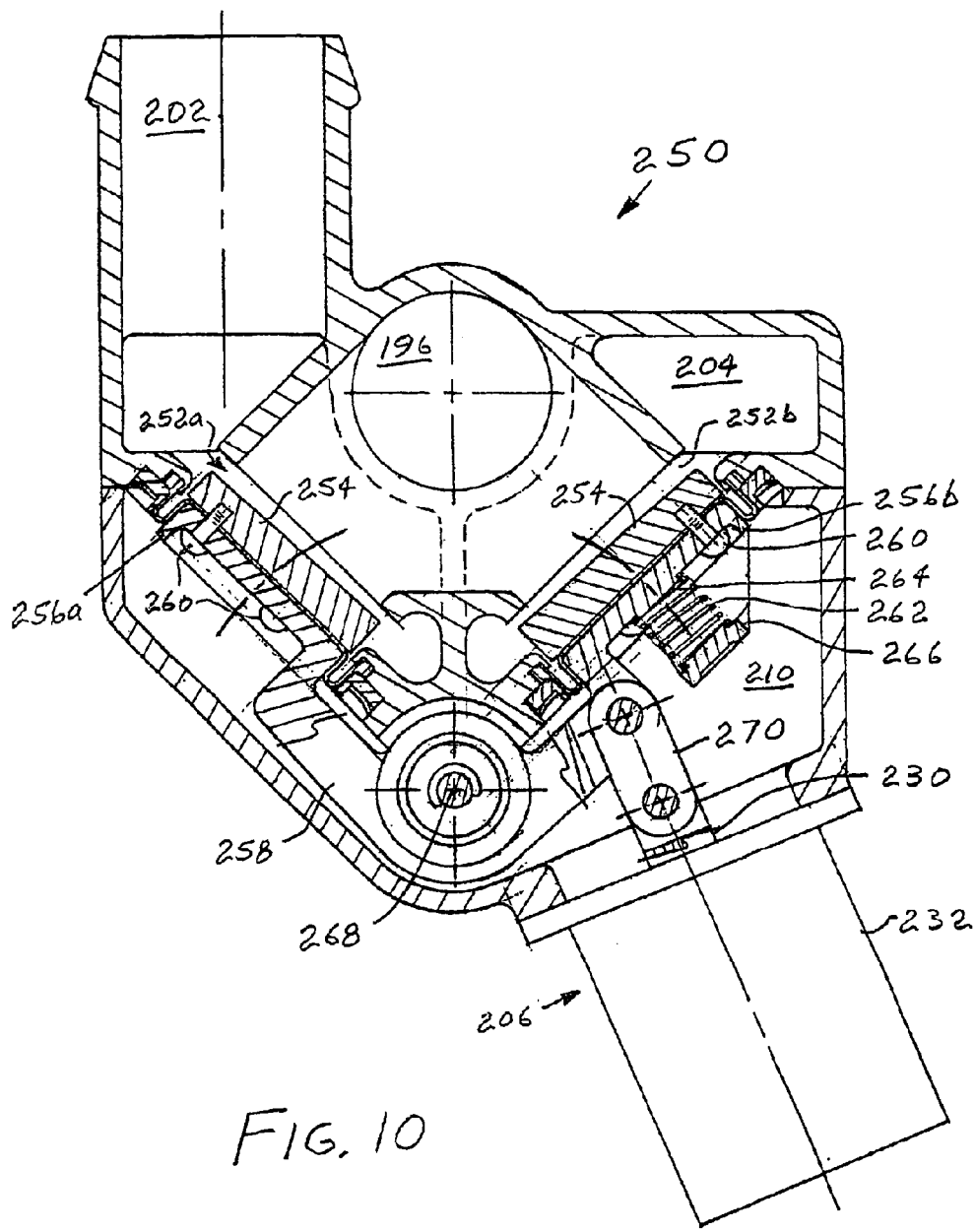
FIG. 10 is a sectional view of an improved low flow impedance three-way flow control valve assembly of the present invention wherein spring valves have been replaced by mechanical metering edges.

With reference now to FIG. 10, thereshown in a sectional view is improved low flow impedance three-way flow control valve assembly 250. Three-way flow control valve assembly 250 is an alternate low flow impedance three-way flow control valve assembly comprising first and second mechanical metering edges 252a and 252b in place of the first and second spring valves 192a and 192b. It is generally constructed according to the above described architecture of three-way flow control valve assembly 190 and utilizes many of the same parts. In this case however, valve heads 254 serve directly in forming the metering edges 252a and 252b. In addition, first and second valve pistons 256a and 256b are formed as extended portions of lever 258. Further, the valve heads 254 are fixedly attached to the first and second valve pistons 256a and 256b by bolts 260 and thus directly to the lever 258. The lever 258 acts against a dedicated return spring 262 that is located above the second valve piston 256b by a boss 264 and compressed between the second valve piston 256b and a bracket 266. The return spring 262 applies closing force to the second valve piston 256b and is thereby utilized for urging the valve heads 254 and the solenoid plunger 230 toward their fail safe positions.

Because of the curvilinear motion of the lever 258 resulting from its motion about pivot point 268, it is necessary to locate the pivot point 268 in a nominally coplanar manner with the rolling diaphragms 212 in order to avoid lateral distortion thereof as a byproduct of lever motion. This results in a lateral component in the closing motion of the valve heads 254. Moreover as shown in the half open position depicted in FIG. 10, the curvilinear motion results in the orifices formed by the first and second mechanical metering edges 252a and 252b being generally wedge shaped. Also, there is no provision for accommodating mechanical tolerances in the three-way flow control valve assembly 250. This may require selective assembly whereby, for instance, a length graduated selection of links 270 may be required to position the body 232 of the pull-type solenoid 206 in a sufficiently accurate manner.

Having described the invention, however, many modifications thereto will become immediately apparent to those skilled in the art to which it pertains, without deviation from the spirit of the invention. Such modifications fall within the scope of the invention.

INDUSTRIAL APPLICABILITY

The improved low flow impedance two-way and three-way flow control valves 10, 110, and 160, and three-way flow control valve assemblies 190 and 250 are optimized for selectively controlling automotive engine heated coolant flow to a host vehicle's radiator and/or a bypass line, and thus for optimizing engine operating conditions. It is believed that this will serve to improve fuel economy and because of that it is further believed that the technology will find wide spread commercial usage.

What is claimed is:

1. An improved low flow impedance three-way flow control valve for selectively distributing fluid flow entering an input port between first and second output ports, the improved low flow impedance three-way flow control valve generally being of the type having a housing; an axially oriented inlet port located in a first end of the housing; first and second annularly oriented output passages disposed within the housing and fluidly isolated one from another by a central housing bulkhead, the first annularly oriented output passage being located proximate to a first end of the housing and the second annularly oriented output passage being located proximate to the second end of the housing; and an axially moving valve spool, the valve spool being positioned by a valve stem and including an axially oriented flow channel, wherein the improvement comprises:

a rolling diaphragm located proximate to the central housing bulkhead for fluidly isolating the output passages one from another and constraining the valve spool for axial movement within the housing;

first spring valve means captured between the valve spool and a shoulder located within the first end of the housing for selectively metering a flow of fluid from the inlet port to the first output passage via a round edged helical orifice formed between the open coils of the first spring valve as a function of the instant axial position of the valve spool and the differential pressure therebetween; and second spring valve means captured between the valve spool and the second end of the housing for selectively metering a flow of fluid from the inlet port to the second output passage via the flow channel and a round edged helical orifice formed between the open coils of the second spring valve as a function of the instant axial position of the valve spool and the differential pressure therebetween.

2. The improved low flow impedance three-way flow control valve of claim 1, wherein the improvement further comprises:

a proportional solenoid for axially positioning the valve stem and valve spool;

the first spring valve means being configured with stronger compression force than the second spring valve means for urging the valve stem and valve spool towards the plunger;

a differential rolling diaphragm located proximate to the proportional solenoid for fluidly isolating the plunger cartridge of the proportional solenoid from fluid generally present within the three-way flow control valve;

the shoulder being configured as part of an axially adjustable ring for positioning the shoulder such that a selected sum of axial opening values of the first and second round edged helical orifices is achieved; and means for adjustably attaching the valve stem to the valve spool for relative axial positioning thereof, after the axially adjustable ring has been properly positioned, such that the round edged helical orifice of the first spring valve is substantially closed when the proportional solenoid is fully energized thereby positioning the plunger at its nominal travel limit.

3. The improved low flow impedance three-way flow control valve of claim 1, wherein output flow from its first radially oriented output passage is blocked via not providing an output port therefor so as to reconfigure the improved low flow impedance three-way flow control valve of claim 3 as a normally closed two-way valve.

* * * * *